(12) United States Patent
Marra et al.

(10) Patent No.: US 6,648,425 B2
(45) Date of Patent: Nov. 18, 2003

(54) ECP EMPTY/LOAD TRAINLINE SETTING METHOD

(75) Inventors: Jon M. Marra, Henderson, NY (US); Dale R. Stevens, Adams Center, NY (US); James R. Truglio, Watertown, NY (US)

(73) Assignee: New York Air Brake Corporation, Watertown, NY (US)

( * ) Notice: Subject to any disclaimer, the term of this patent is extended or adjusted under 35 U.S.C. 154(b) by 0 days.

(21) Appl. No.: 10/241,587

(22) Filed: Sep. 12, 2002

(65) Prior Publication Data
US 2003/0047992 A1 Mar. 13, 2003

Related U.S. Application Data

(60) Provisional application No. 60/318,368, filed on Sep. 12, 2001, and provisional application No. 60/323,103, filed on Sep. 19, 2001.

(51) Int. Cl.[7] .................................................. B60T 8/18
(52) U.S. Cl. ............................ 303/22.2; 303/22.6; 303/7
(58) Field of Search ........................... 303/3, 7, 18, 20, 303/22.1, 22.2, 22.6

(56) References Cited

U.S. PATENT DOCUMENTS

| | | | | |
|---|---|---|---|---|
| 5,551,765 A | * | 9/1996 | Sich | 303/7 |
| 5,803,554 A | * | 9/1998 | Maruta et al. | 303/3 |
| 5,927,822 A | * | 7/1999 | Hart | 303/7 |
| 6,334,654 B1 | * | 1/2002 | Root et al. | 303/7 |
| 2002/0050737 A1 | * | 5/2002 | Root et al. | 303/7 |

* cited by examiner

Primary Examiner—Christopher P. Schwartz
(74) Attorney, Agent, or Firm—Barnes & Thornburg

(57) ABSTRACT

A method of controlling the empty/load setting on cars having electropneumatic brakes. A first signal is set to an empty/load status. The first signal and a second signal is transmitted to the cars. The cars set their empty/load status to the status and in response to the receipt of both signals. The cars transmit their empty/load status, and the empty/load status of the cars is received and displayed.

9 Claims, 3 Drawing Sheets

ECP EMPTY/LOAD TRAINLINE SETTING METHOD

CROSS-REFERENCE

The present application claims the benefit of Provisional Application Ser. No. 60/318,368 filed Sep. 12, 2001 and Provisional Application Ser. No. 60/323,103 filed Sep. 19, 2001, both of which are incorporated herein by reference.

BACKGROUND AND SUMMARY OF THE INVENTION

The present invention relates generally to empty/load devices and, more specifically, to empty/load devices in electric-controlled pneumatic (ECP) brake systems.

On trains operating with ECP braking, there exists a potential single point of failure related to the head end unit (HEU) commanding all cars to an erroneous empty or loaded car weight for the purpose of determining the proper brake cylinder pressure. This could lead to a potential unsafe condition in that the train may be either under- or over-braked.

The present industry specifications for ECP braking require a mechanism for the ECP HEU to command a train-wide empty or loaded state to all ECP car control devices (CCDs). For cars not equipped with a load sensing device, the CCDs use this command to adjust brake cylinder pressure to provide the proper braking force based on total car weight. For example, on certain types of cars, the emergency brake cylinder pressure value could be 36 psi for an empty car and 77 psi for a fully loaded car. This results in approximately 50% more braking force when the car is loaded as compared to when the car is empty.

The command signal from the HEU is transmitted whenever there is a change of empty/load state, as requested by the train operator, and once every 120 seconds during normal train operations. Current ECP industry specifications allow a change to either empty or loaded while the train is stopped and allow a change only from empty to loaded when the train is in motion. Because there is a single command to set the state of the entire train, potential single point of failures exist that could cause this signal to be commanded erroneously. These failure modes include the following:

1) The trainline empty/load command signal fails to the improper state.
2) The HEU fails to command the empty/load signal when the train operator requests a change.
3) The ECP system operator interface fails to allow the proper empty/load selection.
4) The train operator fails to request the proper empty/load state for the train.

The present method of controlling the empty/load setting on cars having electropneumatic brakes addresses these problems. A first signal is set to an empty/load status. The first signal and a second signal is transmitted to the cars. The cars set their empty/load status to the status and in response to the receipt of both signals. The cars transmit their empty/load status, and the empty/load status of the cars is received and displayed.

The first signal is sent periodically, whereas the second signal is sent after the empty/load status of the first signal is confirmed. The display not only displays the cars' empty/load status, but it also displays the current empty/load status of the first signal.

A prompt may be provided for the empty/load status to be confirmed for various conditions. These generally include: (1) after the train has been stopped; (2) after the train has slowed down to a predetermined speed, which is an indicia of loading/unloading of the cars; or (3) after the cars have been loaded/unloaded. The prompts can come from train speed control systems and/or loading/unloading systems. Also, the train speed control systems and the loading/unloading systems may automatically change the empty/load status.

These and other aspects of the present invention will become apparent from the following detailed description of the invention, when considered in conjunction with accompanying drawings.

DETAILED DESCRIPTION OF THE PREFERRED EMBODIMENTS

Figure 1:
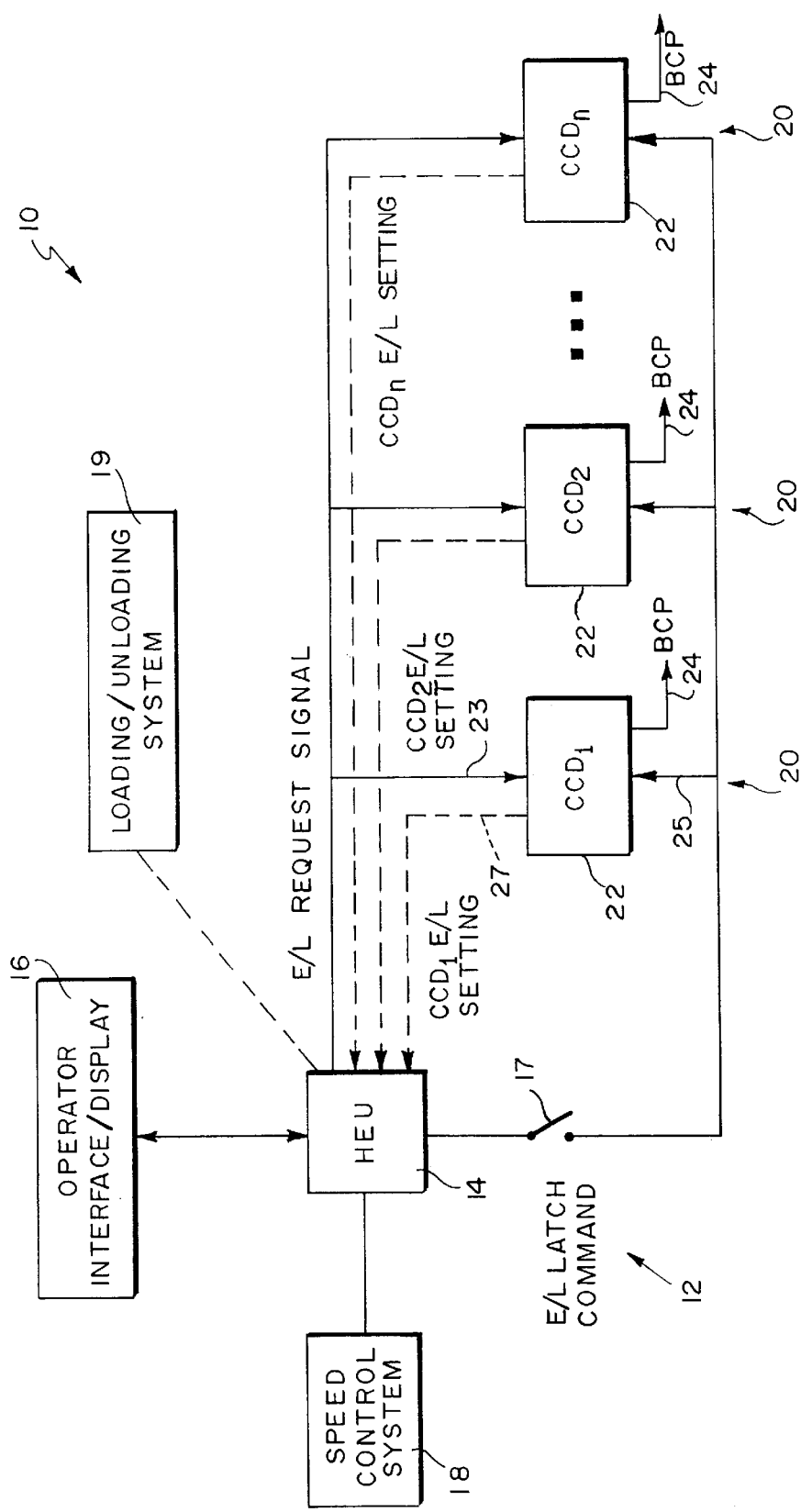
FIG. 1 is a block diagram of a train system illustrating the signal flow incorporating the principles of the present invention.

FIG. 1 shows a train 10 having a head end or a locomotive 12 and a plurality of cars 20. The locomotive 12 includes a head end unit (HEU) 14 and an operator interface/display 16. The locomotive 12 includes a speed control unit 18. Also, a loading/unloading system 19 is shown communicating with HEU 14. The loading/unloading system 19 is generally remote from the locomotive 12 or may be part of the locomotive system. Switch 17 represents the logic choice to send the second or latch command signal for the car control devices (CCDs) 22 over input or wire 25. It may be a switch on the operator interface, or it may be in response to other inputs.

Each of the cars includes a CCD 22, which communicates with the HEU 14 and provides control at 24 for the pneumatic brakes BCP on each of the cars. Each of the cars 20 receives a first signal on line 23 and a second signal on line 25. It reports back to the HEU 14 on 27. These three separate inputs on lines 23, 25 and 27 for a communication are shown to illustrate flow. They are basically signals provided on a single communication medium. This may be a wire running throughout the train or may be over radio. In the present industry, this is a single wire which communicates between the HEU 14 and all of the CCDs 22 in each of the cars. As is well-known in the industry, other signals are provided between the HEU 14 and the CCDs 22.

The proposed solution addresses all of the failure modes listed above. The first failure mode is mitigated by requiring two separate trainline signals to establish a change of empty/load train setting. The first signal 23 is designated as the empty/load request signal and is transmitted periodically to all ECP trainline devices. This could be part of the existing HEU beacon command or transmitted separately. This signal 23 represents the current state of the operator-requested empty/load setting. The second signal 25 is designated as the empty/load latch command and is only transmitted on the ECP trainline when the train operator confirms the correct empty/load selection. This command 25 is transmitted to all ECP trainline devices as a non-periodic signal. When the empty/load latch command 25 is received by the CCDs 22, they read and store in memory the current state of the empty/load request signal 23. This then establishes the new empty/load setting for cars not equipped with load sensing devices. In addition to these command signals, the CCDs 22 all report back to the HEU 14 the status of their current load setting 27. This information can be used by the HEU 14 to provide feedback to the train operator as to what the cars are actually set to and to provide a means of enforcing the correct empty/load setting on the train 10.

Figure 2:
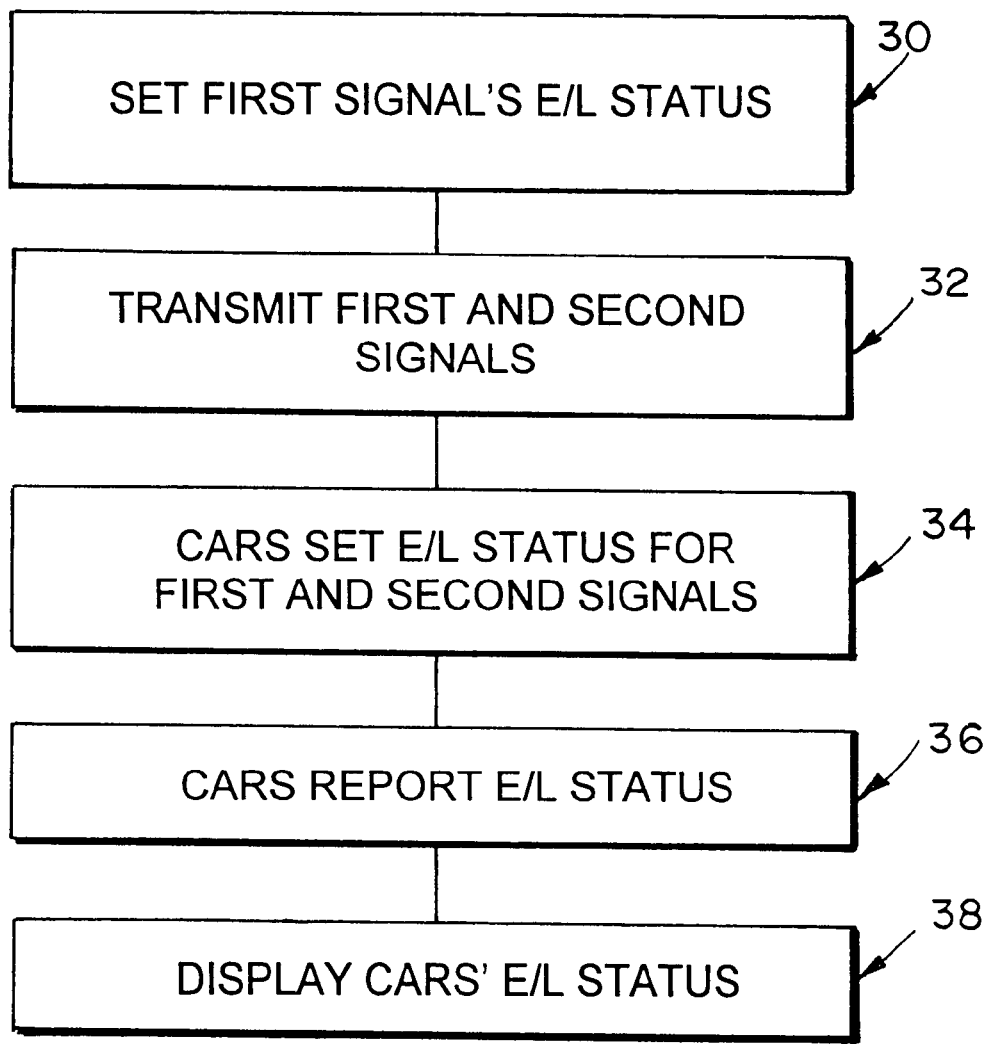
FIG. 2 is a flow chart of an embodiment of a method according to the present invention.

As illustrated in FIG. 2, the method includes setting the first signal's empty/load status 23 at 30. The first signal 23 and the second signal 25 are then transmitted at 32. The cars set then reset their empty/load status as a function of the first and second signals at 34. Both first and second signals must be received, and the status is set to the empty/load status of the first signal. Next, the cars report back their empty/load status 27 at 36. The cars' empty/load status is then displayed at 38 on display 16.

In addition to the logic described above, other failure modes are mitigated by requiring that the train operator always select a train empty/load setting prior to moving the train after a load change has occurred. This can be accomplished by always prompting the operator to either change or confirm the train empty/load setting whenever the brakes are released and the train starts to move. If the operator fails to do this, the HEU 14 could enforce a penalty brake and stop the train. Other alternatives could be to interface the HEU 14 with the locomotive slow speed control system 18 or to the loader/unloader system 19 via a wireless interface. This would provide an input to the HEU 14 when the train is being loaded or unloaded.

Figure 3:
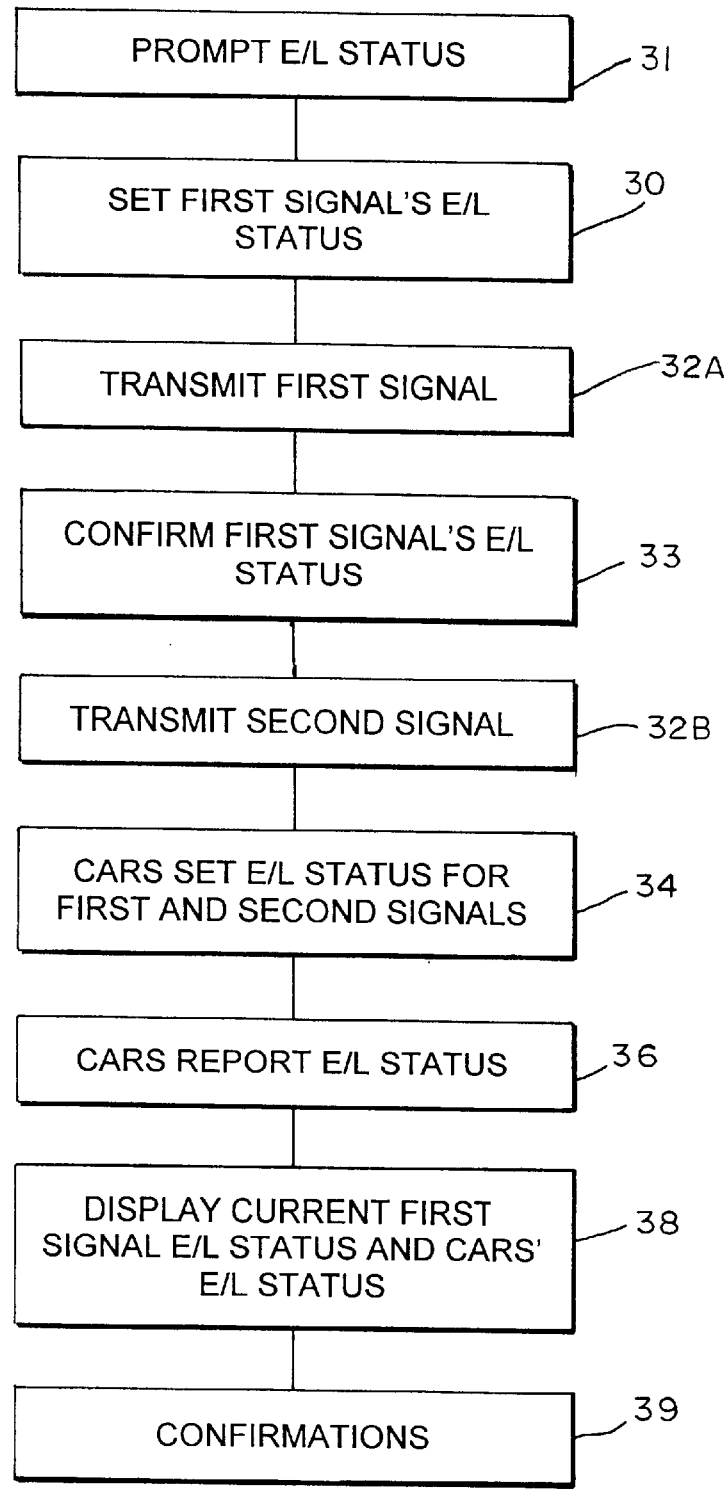
FIG. 3 is a flow chart of another embodiment of the method incorporating the principles of the present invention.

This expanded method is illustrated in FIG. 3 and includes the following steps:

A) Operator is prompted to change or confirm the present empty/load status at 31.

B) HEU 14 displays on display 16 the current state of empty/load request signal and CCD empty/load setting.

C) Operator selects a new empty/load setting for the train at 30.

D) HEU 14 transmits the new empty/load request signal to all CCDs 22 at 32A.

E) Operator confirms the request and issues a command to execute the change at 33.

F) HEU 14 transmits the empty/load latch command to all CCDs 22 at 32B.

G) All CCDs 22 without a load sensing device change their load setting to match the empty/load request and adjust brake cylinder pressure (BCP) accordingly at 34.

H) All CCDs 22 start reporting the new empty/load setting in their status report to the HEU 14 at 36.

I) HEU 14 displays current state of empty/load request and CCD empty/load setting to the operator at 38.

J) Operator confirms and accepts the change at 39.

With the logic of FIGS. 2 and 3, a failure of either one of the two trainline signals sent by the HEU 14 will not result in a change of the empty/load settings of the CCDs 22. Thus, it will not result in an incorrect empty/load state of the CCDs 22.

Although the present invention has been described and illustrated in detail, it is to be clearly understood that this is done by way of illustration and example only and is not to be taken by way of limitation. The spirit and scope of the present invention are to be limited only by the terms of the appended claims.

What is claimed:

1. A method of controlling the empty/load settings on cars having electropneumatic brakes on a train, the method comprising:

setting a first signal to an empty/load status;

transmitting the first signal and a second signal to the cars;

the cars setting their empty/load status to the status of and in response to receipt of both signals;

the cars transmitting their empty/load status; and receiving and displaying the received empty/load status of the cars.

2. A method according to claim 1, including a prompt to confirm or change the empty/load status after the train has stopped.

3. A method according to claim 1, including a prompt to confirm or change the empty/load status after the train has slowed down to a predetermined speed.

4. A method according to claim 1, including a prompt to confirm or change the empty/load status after the train has loaded/unloaded.

5. A method according to claim 1, including displaying the current empty/load status.

6. A method according to claim 1, including confirming the empty/load status of the first signal before transmitting the second signal.

7. A method according to claim 1, wherein the first signal is periodically sent, and the second signal is sent only after confirmation.

8. A method according to claim 1, wherein the empty/load status is automatically changed by a train's speed control system.

9. A method according to claim 1, wherein the empty/load status is automatically changed by a loading/unloading system.

* * * * *